United States Patent
Zaun et al.

(10) Patent No.: US 6,938,700 B2
(45) Date of Patent: Sep. 6, 2005

(54) KNOCK-ON SWEEP STRUCTURE AND TOOLS THEREFOR

(75) Inventors: Richard David Zaun, West Des Moines, IA (US); Benoit Poutré, Ankeny, IA (US); Donald Ray Peck, Clive, IA (US); Mark Beeck, Ankeny, IA (US); Richard Wayne Hook, West Des Moines, IA (US); James Michael VanAuwelaer, Ankeny, IA (US); Jarrod Ray Ruckle, Vassar, MI (US)

(73) Assignee: Deere & Company, Moline, IL (US)

( * ) Notice: Subject to any disclaimer, the term of this patent is extended or adjusted under 35 U.S.C. 154(b) by 37 days.

(21) Appl. No.: 10/376,162

(22) Filed: Feb. 28, 2003

(65) Prior Publication Data

US 2003/0150628 A1 Aug. 14, 2003

Related U.S. Application Data

(63) Continuation of application No. 09/982,901, filed on Oct. 19, 2001, now Pat. No. 6,585,058.

(51) Int. Cl.⁷ .............................................. A01B 15/00
(52) U.S. Cl. ...................... 172/762; 172/750; 172/751; 172/753
(58) Field of Search ................................ 172/762, 750, 172/751, 753, 749, 772.5, 772, 763; 37/459, 455, 456

(56) References Cited

U.S. PATENT DOCUMENTS

| | | | |
|---|---|---|---|
| 1,132,335 A | | 3/1915 | Graves |
| 1,173,985 A | | 2/1916 | Schutze et al. |
| 1,219,990 A | | 3/1917 | Noiles |
| 1,345,209 A | * | 6/1920 | Martin ........................ 403/386 |
| 1,361,454 A | | 12/1920 | Fries |
| 1,520,825 A | | 12/1924 | Kinlaw |
| 1,578,771 A | * | 3/1926 | Simons ....................... 172/753 |
| 2,099,796 A | | 11/1937 | Chibnik ........................ 97/203 |
| 2,117,461 A | | 5/1938 | Stemman ..................... 97/203 |
| 2,877,061 A | * | 3/1959 | Blackwood ................. 403/317 |
| 3,061,021 A | | 10/1962 | Shader ........................ 172/750 |
| 3,104,724 A | * | 9/1963 | Pollock ....................... 172/762 |
| 3,106,256 A | | 10/1963 | McBride ..................... 172/750 |
| 3,223,452 A | | 12/1965 | Krekeler ....................... 299/92 |
| 3,371,436 A | | 3/1968 | Swanson ...................... 37/142 |
| 3,371,723 A | | 3/1968 | Appl ........................... 172/753 |
| 3,563,318 A | | 2/1971 | Eberhardt ................... 172/750 |

(Continued)

FOREIGN PATENT DOCUMENTS

| | | |
|---|---|---|
| AU | 3768 | 8/1931 |
| FR | 1304304 | 10/1961 |

OTHER PUBLICATIONS

Picture of a McKay sweep removal tool (RRT-1), date unknown, but believed to be commerically available.

Primary Examiner—Victor Batson

(57) ABSTRACT

Sweep retaining structure includes a spring wire retainer with a base supported in a groove on the underside of the wedge support which mates with a stem portion of the sweep. The wedge support is apertured, and a central curved portion of the retainer passes through the aperture and supports a sweep-contacting end above the surface of the wedge support. The end is biased toward a contact area on the sweep to engage the area and eliminate sweep loss problems by preventing the sweep from slipping downwardly from the mounted position. To remove the sweep, a tool is inserted through the slot to depress the retainer end, and the sweep is forced off the wedge support. A raised area on the sweep directs soil away from the retainer and contact area to reduce wear and eliminate depression of the end during operation. The underside of the raised area positions the wire end and provides bend-resisting support for the wire.

13 Claims, 6 Drawing Sheets

U.S. PATENT DOCUMENTS

| | | | |
|---|---|---|---|
| 3,753,582 A | 8/1973 | Graham | 285/305 |
| 3,773,114 A | 11/1973 | Griffin | 172/762 |
| 3,832,077 A | 8/1974 | Von Mehren | 403/379 |
| 3,880,242 A | 4/1975 | Rogers | 172/740 |
| 4,136,983 A | 1/1979 | Dobberpuhl | 403/108 |
| 4,190,115 A | 2/1980 | Couture | 172/753 |
| 4,367,602 A | 1/1983 | Petersen | 37/142 A |
| 4,505,058 A | 3/1985 | Peterson | 37/142 A |
| 4,676,014 A | 6/1987 | Berchem et al. | 37/142 R |
| 4,751,785 A | 6/1988 | Johansson et al. | 37/142 A |
| 4,799,555 A | 1/1989 | Badger | 172/751 |
| 5,007,484 A | 4/1991 | Johanson | 172/1 |
| 5,465,796 A | 11/1995 | Buescher et al. | 172/762 |
| 5,558,165 A | 9/1996 | Bucher et al. | 172/721 |
| 5,711,378 A | 1/1998 | Yeager | 172/730 |
| 6,289,996 B1 | 9/2001 | Parish | 172/730 |
| 6,315,058 B1 | 11/2001 | Birkenbach et al. | 172/762 |
| 6,585,058 B2 * | 7/2003 | Zaun et al. | 172/762 |
| 6,684,963 B1 * | 2/2004 | Poutre et al. | 172/750 |

* cited by examiner

KNOCK-ON SWEEP STRUCTURE AND TOOLS THEREFOR

This is a continuation of application Ser. No. 09/982,901 filed 19 Oct. 2001 now U.S. Pat. No. 6,585,058, that application incorporated by reference in its entirety in this present application.

FIELD OF THE INVENTION

The present invention relates generally to tillage tools and, more specifically, to a knock-on sweep and structure for preventing the sweep from falling off the end of a shank.

BACKGROUND OF THE INVENTION

Standard assemblies for implements such as chisel plows and field cultivators typically include a spring trip shank assembly extending downwardly to a tool-receiving end which mounts a shovel, point or sweep. Previously available mounting structure included bolts extending through holes in the tool and the shank to secure the tool. When the tool in such an assembly has to be replaced because of wear or damage, the bolts must be removed. Wear and corrosion of the bolts substantially hinders removal and often makes the replacement a difficult and time-consuming task.

Several solutions to the problem of easily and quickly replacing worn elements such as sweeps on shanks have been developed over the years, including adapter brackets providing a self-locking fit with a matching taper on knock-on sweeps. Frangible pins and bolts have also been suggested. However, most retaining devices have suffered from one or more problems, including need for additional parts and the loss of sweeps when encountering high removal forces during transport and during rebounding of the shank from a tripped position. To reduce incidences of sweeps falling off the shanks in quick mount arrangements, some manufacturers have offered detent mechanisms such as a retaining clip in the form of a sheet metal stamping with a spherical protrusion that fits into a hole in the sweep. To release the sweep, a screwdriver or other tool is used to depress the clip and move the protrusion away from the hole. Other detent arrangements are shown, for example, in U.S. Pat. Nos. 3,061,021 and 6,289,996. Such detents generally help retain the sweeps on the shanks, but the forces exerted on a sweep, particularly forces exerted on deep tillage tools, can be so great that the sweep fails to stay on the shank. The geometry of most previously available sweep detent arrangements, including non-symmetrical mating surfaces on some, usually limits penetration of the retaining surface into the hole so that retaining forces are limited. Some care must be taken to align the protrusion with the hole, and part tolerances, variations in force used to mount the sweep, or lack of indexing of the clip relative to the shank can make such alignment troublesome. A relatively small, ramped contact area between the clip and the hole also increases the potential for losing a sweep. Soil moving up and around the stem portion of the sweep can move the clip from the detent position or wear away the clip until it is ineffective for holding the sweep on the shank. Extreme forces on the detent, such as those which occur during rebound, can also cause deformation of the detent. If the detent deforms, loosened sweeps can unacceptably dangle from the shank or be lost. A hefty detent construction or frequent detent replacements are therefore usually required.

BRIEF SUMMARY OF THE INVENTION

It is therefore an object of the present invention to provide an improved sweep retaining structure for a knock-on sweep that overcomes most or all of the above-mentioned problems. It is another object to provide such an improved sweep retaining structure which is simple and inexpensive to manufacture and assemble and yet reliably holds the sweep on the shank and facilitates quick and easy removal of the sweep. Further objects include providing an improved sweep and providing an improved retainer for use with such structure.

It is yet another object to provide an improved sweep retaining structure which provides reliable retention independently of manufacturing tolerances, forces applied during sweep mounting and precise alignment of mating portions of the sweep assembly. It is another object to provide such a structure having an improved and simplified retainer mounting arrangement. It is a further object to provide such a structure wherein the retainer is positioned for proper engagement with a contact area on the sweep without direct contact with a bolt or similar fastener. It is still another object to provide such a structure having support and guidance structure for the detent to facilitate alignment and prevent bending of the detent.

It is yet another object to provide an improved sweep retaining structure which eliminates need for flat retaining clips and which provides improved wear and retaining characteristics compared to at least most previously available clip type retaining structures. It is another object to provide such a sweep retaining structure with integral retainer guide and wear reducing structure for improving retention and preventing retainer deformation.

Sweep retaining structure constructed in accordance with the teachings of the present invention includes a retainer fabricated from wire spring material and including a bent wire base supported in a groove on the underside of the wedge support which mates with stem portion of the sweep. The wedge support is apertured, and a central curved portion of the retainer passes through the aperture and supports a sweep-contacting end above the surface of the wedge support. The end is biased toward a contact area on the sweep, preferably the top edge of a slot in the stem, to engage the area and eliminate sweep loss problems by preventing the sweep from slipping down away from the wedged mounted position. To remove the sweep, a tool is inserted through the slot to depress the retainer end, and the sweep is forced downwardly off the wedge support.

The retainer is simple, inexpensive and reliable. The groove support eliminates a separate retainer fastening bolt or contact with a fastening bolt and improves ease of assembly, proper positioning and wearability of the retainer. The retainer can be easily slipped into position on the wedge support.

The slot in the stem is preferably located near the top of the connecting portion and defines an end contact edge. To protect the edge and the end of the retainer from wear as well as prevent soil and debris from depressing the end, a portion of the stem directly ahead of the slot is raised relative to the remainder of the surface of the stem and relative to the contact edge. The raised portion directs the soil and debris away from the slot. The underside of the raised portion defines a retainer guiding and support channel which holds the wire end in the optimum sweep locking position and provides support for the wire to eliminate retainer deformation when high sweep removal forces are encountered during operation. The operator can clearly see if the sweep is properly wedged onto the sweep support by simply viewing the position of the wire end relative to the contact edge and the guiding and support channel.

In one embodiment of the sweep, a central portion just below the stem also includes a raised area to help direct material away from the stem to improve stem life and assist in reducing wear in the slot area and in the end of the retainer.

These and other objects, features and advantages of the present invention will become apparent to one skilled in the art upon reading the following detailed description in view of the drawings.

BRIEF DESCRIPTION OF THE INVENTION

DETAILED DESCRIPTION OF THE INVENTION

Figure 1:
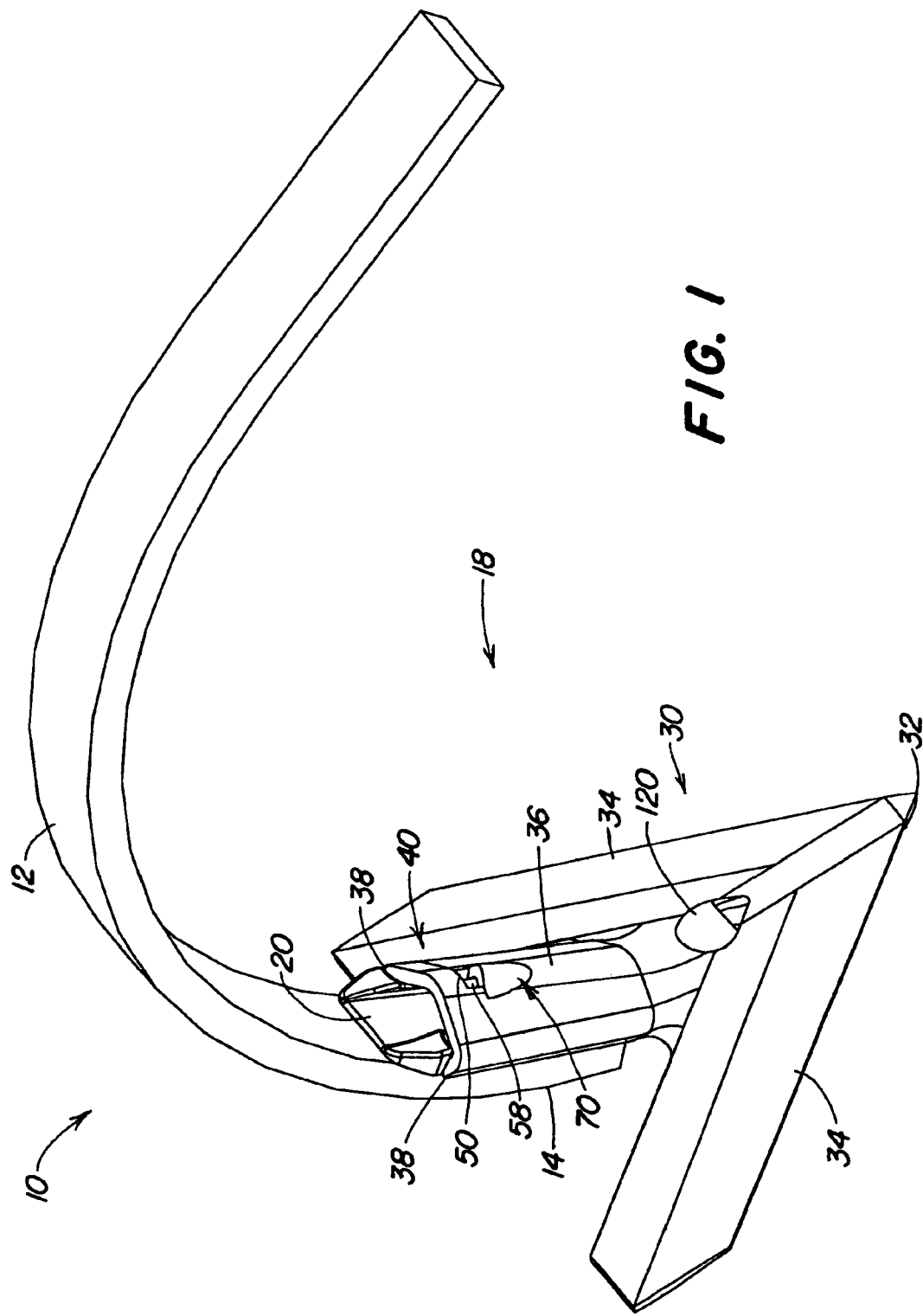
FIG. 1 is a side perspective view of a lower portion of a shank assembly including a sweep and sweep retaining structure constructed in accordance with the teachings of the present invention.

Referring now to FIG. 1, therein is shown the lower portion of a spring trip shank assembly 10 including a shank 12 having a lower tool-mounting end 14 supporting a knock-on sweep assembly 18. The assembly 18 includes a wedge-shaped adapter bracket or sweep support 20 having an aft face conforming to the forward face of the end 14. The support 20 is secured to the end by two plow bolts (not shown) extending through apertures 22 (FIG. 2) in the sweep support 20 and corresponding apertures in the end 14 of the shank 12. An earthworking tool 30, shown as a sweep in FIGS. 1 and 2, includes a forwardmost tip or point 32 and opposed wing portions 34 diverging outwardly in the rearward direction. An downwardly and rearwardly concave sweep mounting portion or stem 36 includes edges 38 which wrap partially around the bracket 20. The portion 36 provides a wedge fit between the tool 30 and the lower end 14 of the shank 12 when the tool 30 is knocked on the sweep support 20. The portion 36 is slid upwardly over the bracket 20 and then the tool 30 is driven upwardly and rearwardly by several sharp blows from a hammer to wedge the tool into the mounted position on the shank 12.

The sweep mounting portion 36 and the sweep support 20 firmly support the tool 30 on the end 14 without need for mounting bolts directly connected to the sweep 30. Since sweep mounting bolts are eliminated, the sweeps can be quickly driven from the support 20 and easily replaced. However, rebound forces and the like can loosen the wedge fit while operating in the field. To prevent loss of the tool 30 if the wedge fit is loosened during operation, retaining structure indicated generally at 40 is provided. The normal forces operating on a sweep working in the ground tend to urge the sweep back into the wedge fit or mounted position if the sweep can be retained on the sweep support 20 after the undesired loosening.

The sweep retaining structure 40 includes a contact area 50 centrally located at the upper portion of the stem or attaching portion 36. A bent wire retainer 54 made of spring steel having a generally round cross section is carried by the sweep support 20 and includes a contact end 58 which is offset forwardly and above the top or forward surface of the sweep support 20. The contact end 58 is biased into a locking position (FIGS. 1 and 2) wherein the flat end 58 abuts the mating flat contact area 50 when the sweep 30 is in the mounted position as shown. The surfaces of the area 50 and the end 58 are preferably parallel to each other when in contact. The contact prevents the sweep from moving away from the mounted position until the end 58 is moved toward the sweep support 20 against the bias.

The sweep support 20 includes an aperture 60 (FIG. 2) located between the plow bolt receiving apertures 22, and the bent wire retainer 54 includes a central portion 54c which projects through the aperture 60. The bent wire retainer 54 includes a bent wire base portion 54b which lies generally in a plane. The sweep support 20 has a front side 20f facing the sweep stem 36 and an opposite rear side 20r, and the bent wire base portion 54b is supported in an arc-shaped groove 66 partially surrounding the top plow bolt aperture 22 on the rear side 20r. The base 54b of the bent wire retainer 54 is captured between the forward face of the shank end 14 and the groove 66 when the support 20 is attached to the shank 12. Good wire retainer support and positioning is thus provided independently of any separate fasteners or need for contact with a plow bolt. During assembly, the end 58 of the bent wire retainer 54 is simply inserted through the aperture 60, and the base portion 54b is positioned in the groove 66.

The stem 36 of the sweep 30 includes a raised soil deflection area 70 which also defines a retainer guiding and support area on the underside of the raised area. The underside of the raised area 70 is concave downwardly and rearwardly and opens in the rearward direction towards the contact area 50 (see FIGS. 2 and 4). The underside of the area 70 receives a portion of the bent wire retainer at a location 54g offset from the end 58 and guides the end 58 towards the contact area 50 as the sweep 30 is driven towards the wedged mounted position. The wire retainer 54 is bent adjacent the location 54g (see FIGS. 4 and 5) so the axis 58a of the end 58 is substantially perpendicular to the plane of the contact area 50. The contact area 50 is preferably the aft edge of a slot 72 located rearwardly adjacent the raised area 70. The top of the edge lies along surface 36t of the stem 36 and is protected by the raised area 70 which extends a substantial distance above the surface to deflect dirt and debris away from the edge and the retainer 54.

Figure 4:
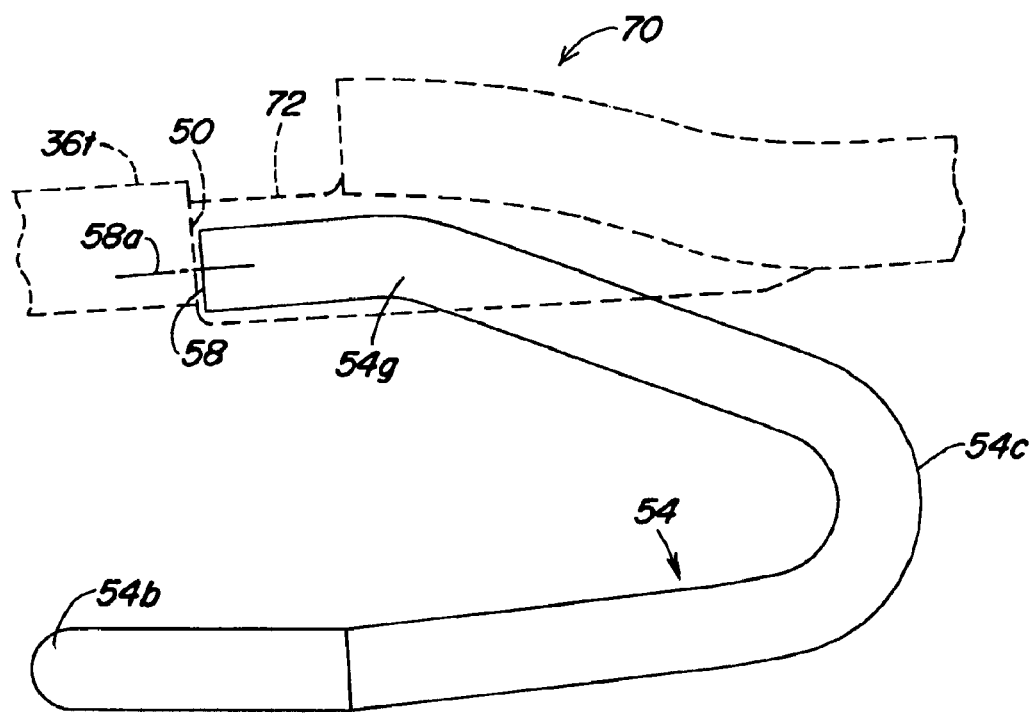
FIG. 4 is a side view of the retainer of FIG. 3.
Figure 5:
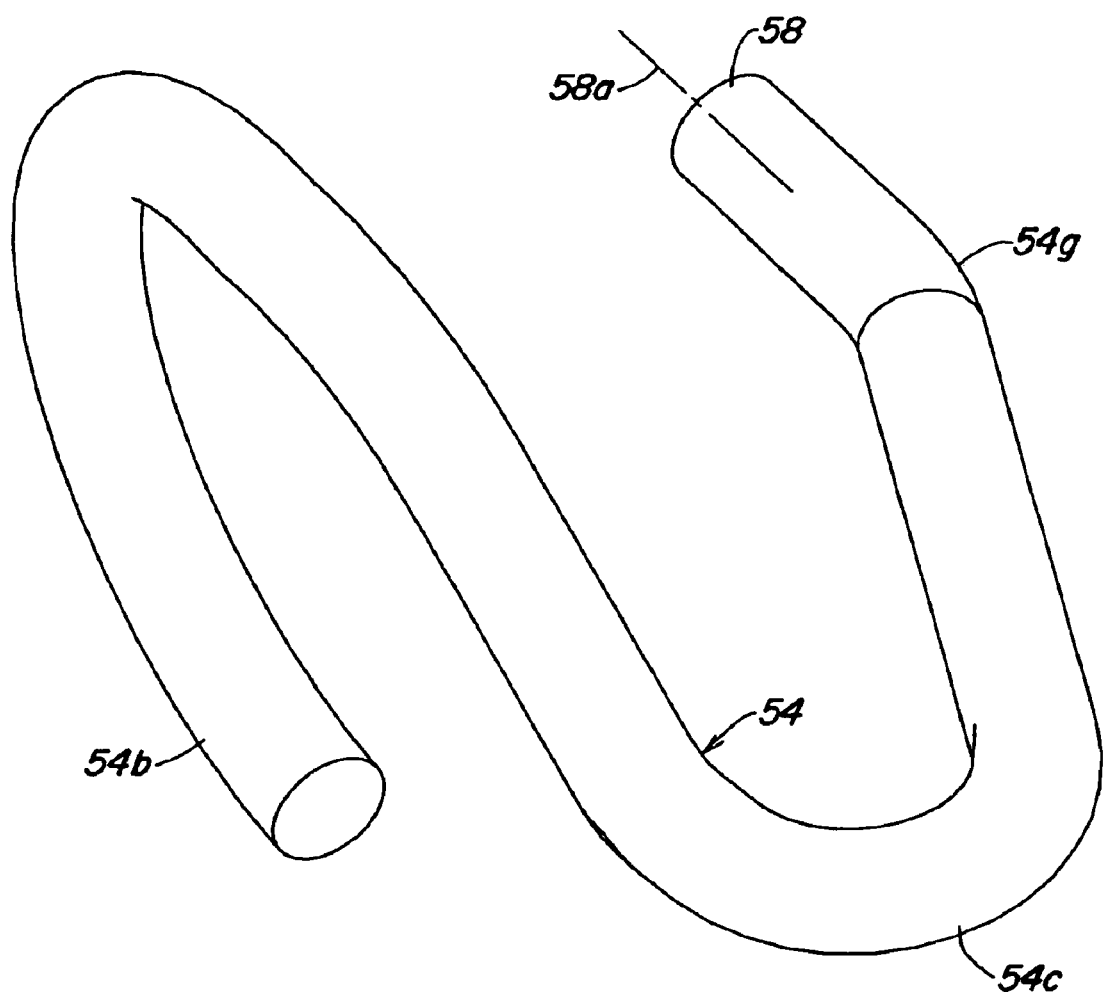
FIG. 5 is a perspective view of the retainer of FIG. 3.

The rearward face of the end 58 is parallel to the plane of the contact area 50 when the sweep is mounted and the end 58 of the bent wire retainer 54 is in the locking position. As the sweep is driven upwardly and rearwardly onto the sweep support 20, the end 58 is urged downwardly until the contact area 50 passes the end 58 of the retainer. The location 54g then springs into the channel-shaped underside of the area 70 so the end 58 is held in the proper position relative to the contact area (FIG. 4). If the sweep 30 begins to move downwardly away from the wedged position, the contact between the end 58 and the contact area 50 holds the sweep closely adjacent the fully wedged position until the soil forces acting on the sweep during operation again wedge the sweep into the locked position. The channel-shaped underside at 70 also supports the end 58 of the wire retainer 54 at points generally on-axis to help the retainer resist bending moments that would otherwise occur when strong sweep-removing forces such as rebound forces are acting to dislodge the sweep. Without the support of the channel-shaped underside, the retainer could easily be deformed by the forces.

Figure 2:
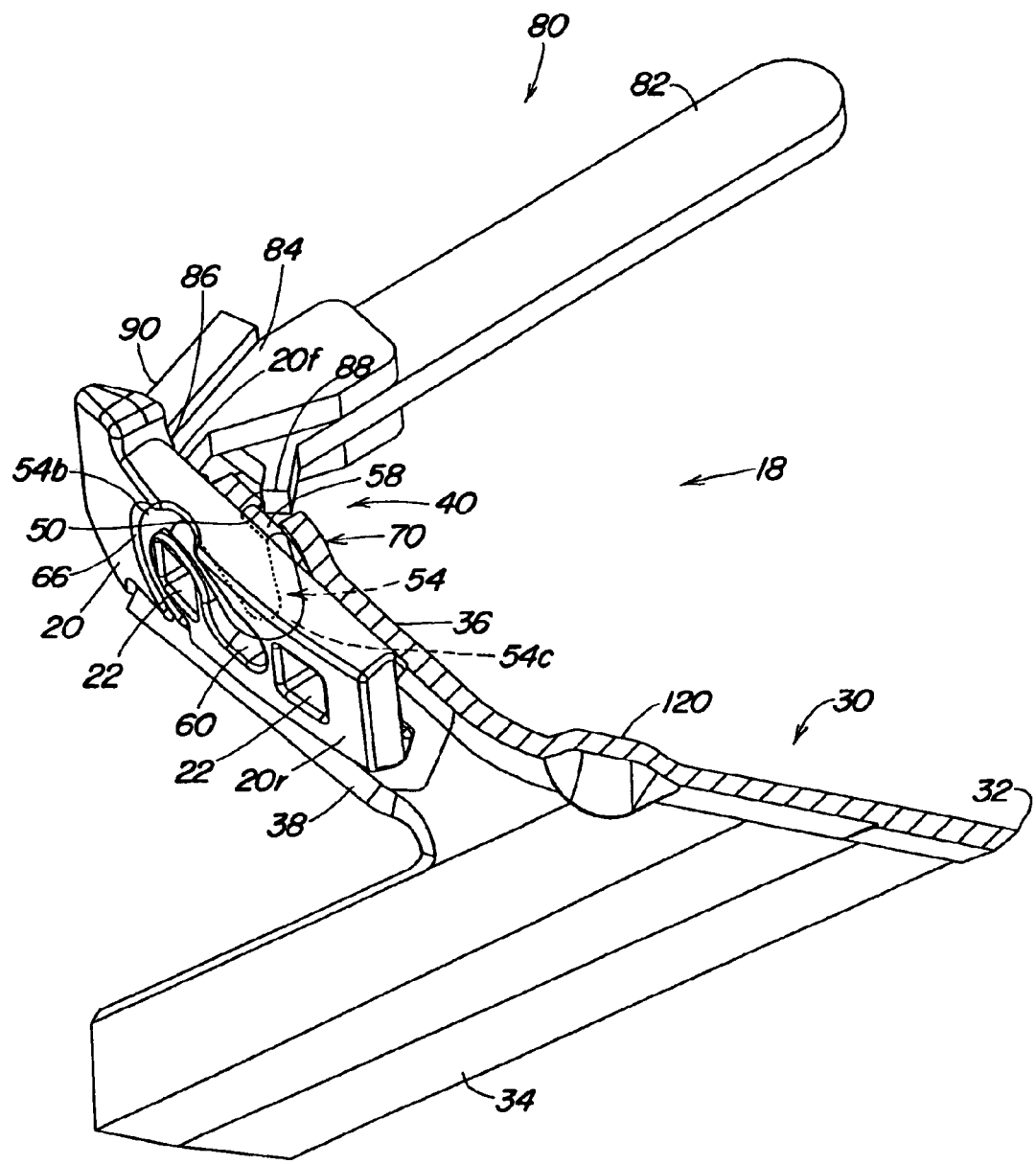
FIG. 2 is an enlarged bottom perspective view of a portion of the assembly of FIG. 1, partially cut away to better show the sweep retaining structure and including a portion of a sweep removing tool.
Figure 3:
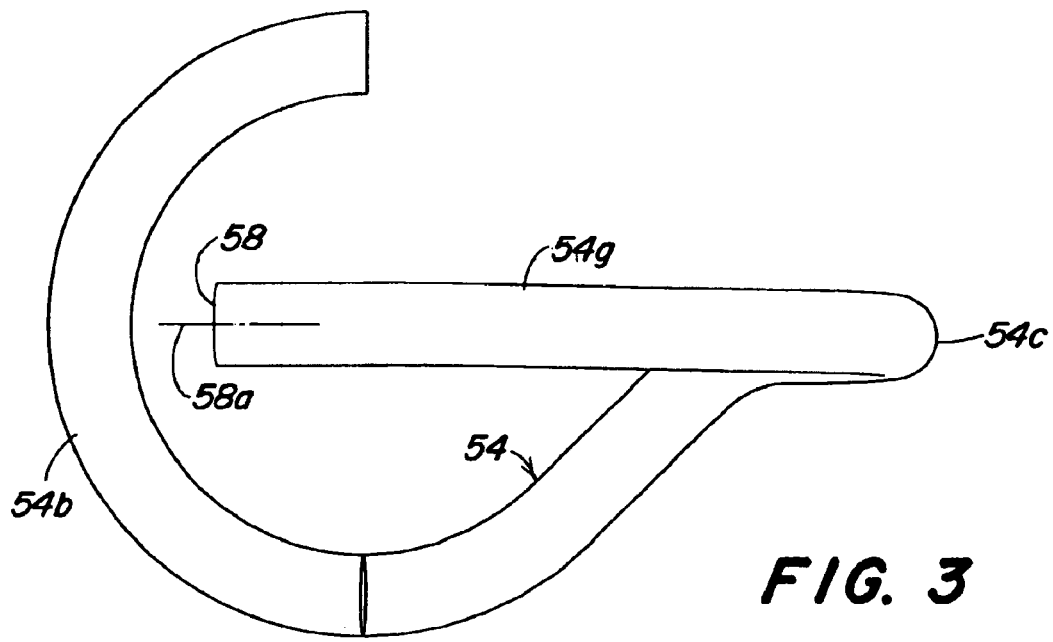
FIG. 3 is a top view of the retainer for the structure of FIGS. 1 and 2.
Figure 6:
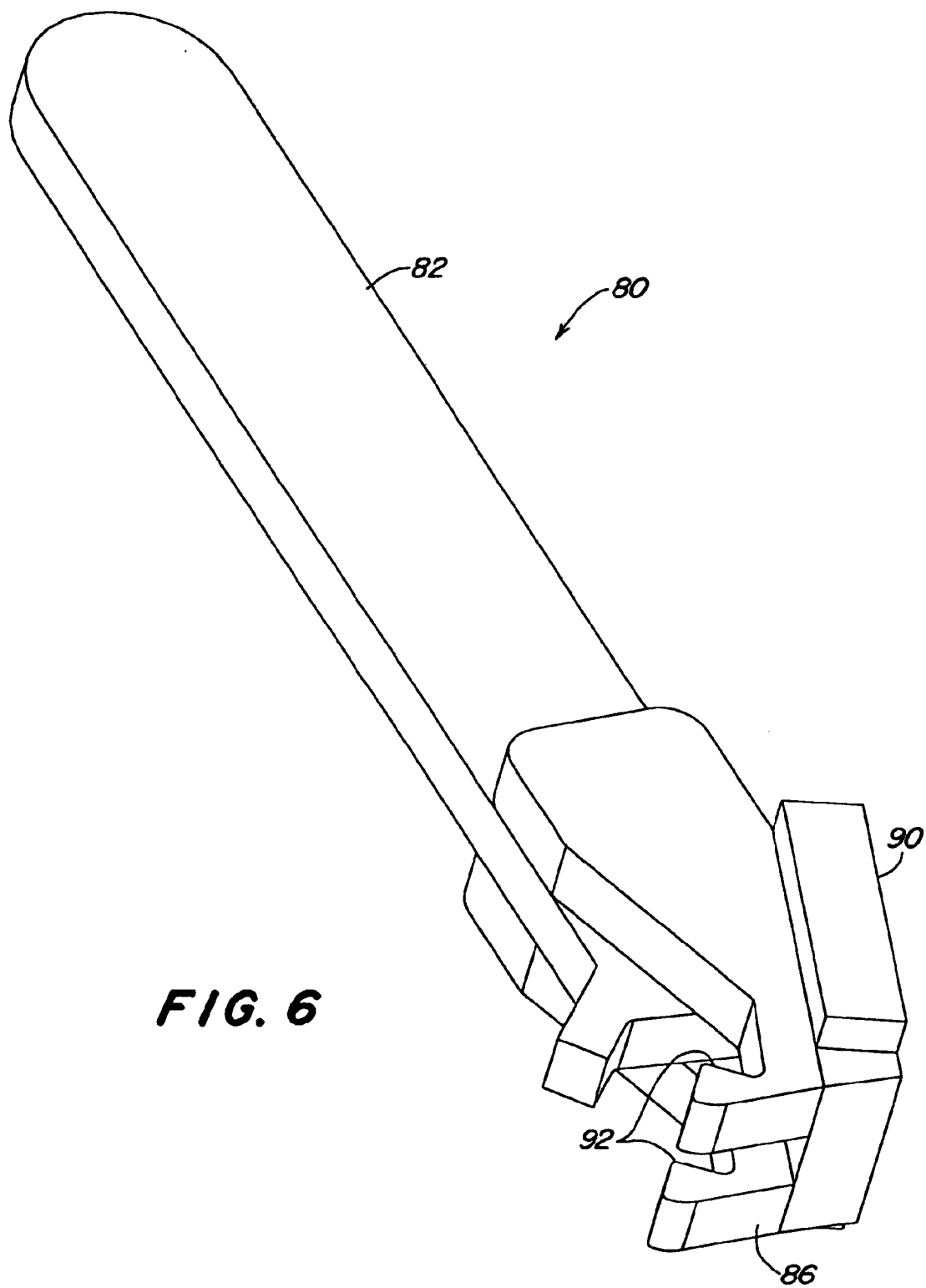
FIG. 6 is an enlarged perspective view of the sweep removing tool of FIG. 2.

Referring to FIGS. 2 and 6, a removal tool 80 is shown which includes a handle 82 supporting a removal end 84 with a support 86 adapted for positioning against the assembly 10 and a retainer depressing extension 88 positioned above the slot 72 and the end 58. The handle 82 is moved towards the sweep 30 to depress the end of the wire retainer 54 below the contact area 50. A hammer is then used to impact a flat surface 90 above the removal end 84 to drive the sweep from the assembly. Transversely spaced ears 92 engage the top edge of the stem 36 for positive tool positioning and sweep engagement and good distribution of impact forces.

Figure 7:
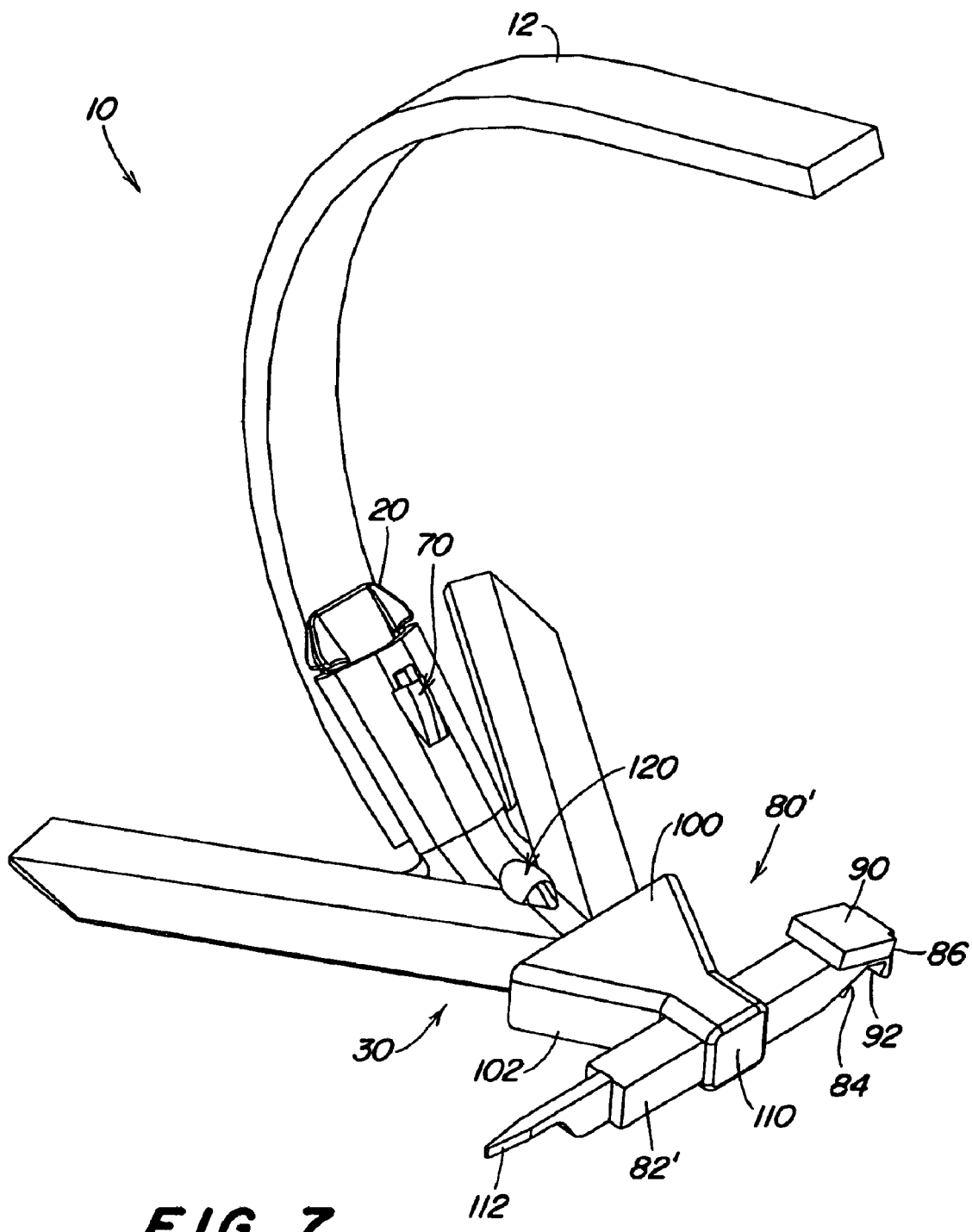
FIG. 7 is a view similar to FIG. 1 and including a modified version of a tool having sweep attaching, sweep removing and dirt removing structure, the tool shown in a position for mounting the sweep.

In an alternate embodiment 80' shown in FIG. 7, an attaching tool 100 is supported from the handle 82' and includes a V-shaped member 102 generally conforming to the forward soil engaging portion of the sweep 30 and adapted for being slidably received over the sweep as shown. A flattened impact area 110 is offset from the sweep point on the side of the handle opposite the member 102. After slipping the sweep 30 onto the sweep support 20, the operator can wedge the sweep in the secured position by hitting the area 110 with several sharp blows of a hammer. The member 102 covers the leading point and edge area, distributes the driving force and protects the sweep from damage. A screwdriver attachment or soil engaging end 112 is attached to the end of the handle 82' opposite the removal end 84.

An additional raised area 120 is formed in the surface of the sweep 30 rearwardly of the point 32 just below the area where the stem 36 connects to the remainder of the sweep. The raised area directs soil and debris outwardly from the stem 36 to increase stem wear life. In addition, the area 120 aids the raised area 70 in directing soil away from the retainer 54 and the contact area 50 for more reliable sweep retention and increased sweep retainer structure life.

Having described the preferred embodiment, it will become apparent that various modifications can be made without departing from the scope of the invention as defined in the accompanying claims.

We claim:

1. A knock-on sweep for a tillage implement including a wedge mount tool support for securing the sweep in a wedged position on a shank for forward movement through soil, and a retaining structure biased into engagement with the sweep when the sweep is in the wedged position to prevent the sweep from dislodging from the sweep support, the retaining structure movable against the bias for removing the sweep from the shank, the knock-on sweep comprising:
   a mounting portion adapted for wedging on the tool support having an uppermost edge;
   a central point located forwardly and below the mounting portion;
   forward edges extending outwardly and rearwardly from the central point;
   a top surface portion extending upwardly and rearwardly from the point to the mounting portion and defining a generally downwardly and rearwardly curved surface;
   a contact surface located forwardly of the uppermost edge, the contact surface extending below the top surface portion and adapted for contacting the retaining structure when the retaining structure is biased into engagement with the sweep; and
   the mounting portion including a central raised area extending upwardly from the top surface portion forwardly adjacent the contact surface to thereby deflect soil away from an uppermost boundary of the contact surface to prevent wearing away of the contact surface and prevent contact of the retaining structure with the soil.

2. The sweep as set forth in claim 1 including a lower soil deflecting surface located behind the point and below the central raised area, the deflecting surface offset above the surface adjacent the mounting portion to deflect soil away from the mounting portion and the retaining structure.

3. The sweep as set forth in claim 1 including a guide portion for receiving and positioning the retaining structure for engagement with the sweep.

4. The sweep as set forth in claim 3 wherein the guide portion comprises an underside surface of the central raised area.

5. The sweep as set forth in claim 4 wherein the underside surface opens towards the contact surface.

6. The sweep as set forth in claim 1 wherein the mounting portion includes a slot adapted for receiving a projection on a sweep removal tool to facilitate removal of the sweep.

7. A knock-on sweep for a tillage implement including a wedge mount tool support for securing the sweep in a wedged position on a shank for forward movement through soil, and a retaining structure biased into engagement with the sweep when the sweep is in the wedged position to prevent the sweep from dislodging from the sweep support, the retaining structure movable against the bias for removing the sweep from the shank, the knock-on sweep comprising:
   a mounting portion adapted for wedging on the tool support;
   a central point located forwardly and below the mounting portion;
   forward edges extending outwardly and rearwardly from the central point;
   a top surface portion extending upwardly and rearwardly from the point to the mounting portion and defining a generally downwardly and rearwardly curved surface;
   a contact surface extending below the top surface portion and adapted for contacting the retaining structure when the retaining structure is biased into engagement with the sweep;
   the mounting portion including a central raised area forwardly adjacent the contact surface to thereby deflect soil away from an uppermost boundary of the contact surface to prevent wearing away of the contact surface and prevent contact of the retaining structure with the soil; and
   wherein the mounting portion includes an upper tool removal edge adapted for receiving spaced ears of a removal tool.

8. The sweep as set forth in claim 7 wherein the mounting portion includes a slot located below the removal edge and adapted to receive a projection on the removal tool.

9. The sweep as set forth in claim 8 wherein the slot is located adjacent the retaining structure when the sweep is in the wedged position, the projection for urging the retaining structure against the bias out of engagement with the contact surface for removing the sweep from the shank.

10. The sweep as set forth in claim 9 wherein the slot is offset a distance from the upper tool removal edge approximately equal to a spacing between the ears and the projection on the removal tool to facilitate moving of the retaining structure against the bias while removal force is applied to the upper tool removal edge.

11. A knock-on sweep for a tillage implement including a wedge mount tool support for securing the sweep in a wedged position on a shank for forward movement through soil, and a retaining structure biased into engagement with the sweep when the sweep is in the wedged position to prevent the sweep from dislodging from the sweep support, the retaining structure movable against the bias for removing the sweep from the shank, the knock-on sweep comprising:

a mounting portion adapted for wedging on the tool support;

a central point located forwardly of the mounting portion;

forward edge structure extending outwardly and rearwardly from the central point;

a top surface portion extending upwardly and rearwardly from the point to the mounting portion and defining a generally downwardly and rearwardly directed surface;

a contact surface extending below the surface and adapted for contacting the retaining structure when the retaining structure is biased into engagement with the sweep;

wherein the mounting portion includes an upper tool removal edge adapted for receiving an engaging portion of a removal tool; and an aperture located adjacent the contact surface and adapted for insertion of the removal tool to facilitate movement of the retaining structure by the removal tool while the engaging portion is received on the tool removal edge.

12. The sweep as set forth in claim 11 wherein the mounting portion includes a central raised area forwardly adjacent the contact surface and offset above the contact surface to deflect soil away from an uppermost boundary of the contact surface to prevent wearing away of the contact surface and prevent contact of the retaining structure with the soil.

13. The sweep as set forth in claim 11 wherein the upper tool removal edge is offset forwardly of the tool support when the sweep is in the wedged position to facilitate engagement of the removal tool.

* * * * *